United States Patent  
Collins, Jr.

(10) Patent No.: US 9,129,176 B2
(45) Date of Patent: Sep. 8, 2015

(54) METHOD AND APPARATUS FOR ASSEMBLING AN IMAGE OF A DOCUMENT

(71) Applicant: Donald A. Collins, Jr., Buford, GA (US)

(72) Inventor: Donald A. Collins, Jr., Buford, GA (US)

(73) Assignee: NCR Corporation, Duluth, GA (US)

( * ) Notice: Subject to any disclaimer, the term of this patent is extended or adjusted under 35 U.S.C. 154(b) by 62 days.

(21) Appl. No.: 13/923,574

(22) Filed: Jun. 21, 2013

(65) Prior Publication Data

US 2014/0374486 A1    Dec. 25, 2014

(51) Int. Cl.
*G06K 9/20* (2006.01)
*G06K 7/14* (2006.01)
*G06K 9/00* (2006.01)
*G06K 19/06* (2006.01)
*G06K 9/22* (2006.01)
*G06K 9/34* (2006.01)
*G06Q 20/20* (2012.01)
*G07D 11/00* (2006.01)

(52) U.S. Cl.
CPC ............ *G06K 7/146* (2013.01); *G06K 9/00442* (2013.01); *G06K 9/00449* (2013.01); *G06K 9/228* (2013.01); *G06K 9/34* (2013.01); *G06K 19/06028* (2013.01); *G06Q 20/20* (2013.01); *G07D 11/006* (2013.01)

(58) Field of Classification Search
CPC . G07G 1/0045; G07G 1/0081; G07G 1/0009; G06K 7/1404; G06K 7/10544; G06K 7/10821; G06K 7/10861; G06K 7/10; G06K 7/10792; G06K 7/0004; G06K 19/06112; G06K 9/00442; G06K 9/00449; G06K 9/228; G06K 9/34; G06K 19/06028; H04N 5/225; G06Q 20/20; G07D 11/006
USPC ............. 382/284, 305, 312; 235/454, 462.01, 235/462.02
See application file for complete search history.

(56) References Cited

U.S. PATENT DOCUMENTS

| | | | |
|---|---|---|---|
| 6,859,334 B1 * | 2/2005 | Kuiseko et al. | 359/727 |
| 7,353,988 B1 * | 4/2008 | Ramachandran | 235/379 |
| 8,561,889 B2 * | 10/2013 | Block et al. | 235/379 |
| 8,570,375 B1 * | 10/2013 | Srinivasan et al. | 348/150 |

* cited by examiner

*Primary Examiner* — Kanjibhai Patel
(74) *Attorney, Agent, or Firm* — Harden E. Stevens, III; Joseph P. Mehrle

(57) ABSTRACT

An optical code scanner is presented for assembling an image of a document from multiple images captured by the optical code scanner. A document is presented to the optical code scanner which captures multiple images where each image includes only a portion of the document. Once every part of the document has been captured in at least one image, the optical code scanner processes the images to generate a single image of the entire document.

20 Claims, 6 Drawing Sheets

METHOD AND APPARATUS FOR ASSEMBLING AN IMAGE OF A DOCUMENT

FIELD OF THE INVENTION

The present invention relates to optical code scanners and more specifically to optical code scanners that read optical codes and capture images of documents.

BACKGROUND

Optical code scanners are used in point of sale terminals to read optical codes on items which are presented to the terminals for purchase as part of purchase transactions. The optical code scanners can be hybrid scanners that use both laser based and image based scanning technology to read optical codes as well as capturing other information. Some optical code scanners use just image based scanning technology. As part of the purchase transactions, the point of sale terminal accepts a payment instrument that may suitably include a check.

The image based scanning technology captures an image of an optical code and processes the image to recover or read the optical code captured in the image. The image is captured using an image capture device. The cost of the image capture device may be reduced by using a low resolution image capture device. The low resolution images produced by the low resolution image capture device still allow for the reading of an optical code captured within the image with little or no increase in the rate of missed reads or failure to read an optical code that is captured in the image. However, lower resolution image capture devices may have a reduced width of image field which limits its ability to capture images of objects larger than an optical code, such as a check for example.

SUMMARY

Among its several aspects, the present invention seeks to overcome or ameliorate at least one of the disadvantages of the prior art, or to provide a useful alternative.

Among its several aspects, the present invention recognizes there is an advantage to using a low cost image capture device while still being able to read optical codes and generate an image of a large document.

In accordance with the teachings of the present invention, an optical code scanner is provided for scanning optical codes and for generating a single image of a document from multiple partial images of the document. The optical code scanner uses a low cost image capture device that cannot capture a large document within a single image but instead captures multiple images where each image contains only a portion of the document. The optical code scanner then processes the multiple images and generates a single image of the entire document.

Among its several aspects, the present invention recognizes there is an advantage to using portions of the document image that overlap or are duplicated along the edges of two adjacent images to match and align the images to form one image of the entire document.

In accordance with an embodiment of the present invention, there is provided a computer implemented method for reading an optical code and creating a single image of a document from multiple images of a portion of the document. The method comprises the steps of: receiving an image from an image capture device; executing the following first group of steps when the received image includes an optical code: processing the received image to recover information encoded within the optical code; and transmitting the recovered information; executing the following second group of steps when the image includes a portion of a document: storing the image; receiving a new image from the image capture device; repeating the storing and receiving steps in the second group of steps until the received image does not include a portion of the document and then executing the following third group of steps: processing each of the stored images to identify the image data that represents the portion of the document captured within each stored image; combining the identified portions of the document from each stored image to create a new single image of the entire document; and transmitting the new image of the document.

In accordance with an embodiment of the present invention, there is provided an optical code scanner comprising: an image capture device operable to capture images of objects presented to the optical code scanner; a memory including computer instructions stored therein; and a processor in communication with the image capture device and the memory where the processor is operable to execute the computer instructions and when the processor executes the computer instructions they cause the processor to perform the following steps: receiving an image from the image capture device; executing the following first group of steps when the received image includes an optical code: processing the received image to recover information encoded within the optical code; and transmitting the recovered information; executing the following second group of steps when the image includes a portion of a document: storing the image; receiving a new image from the image capture device; repeating the storing and receiving steps in the second group of steps until the received image does not include a portion of the document and then executing the following third group of steps: processing each of the stored images to identify the image data that represents the portion of the document captured within each stored image; combining the identified portions of the document from each stored image to create a new single image of the entire document; and transmitting the new image of the document.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
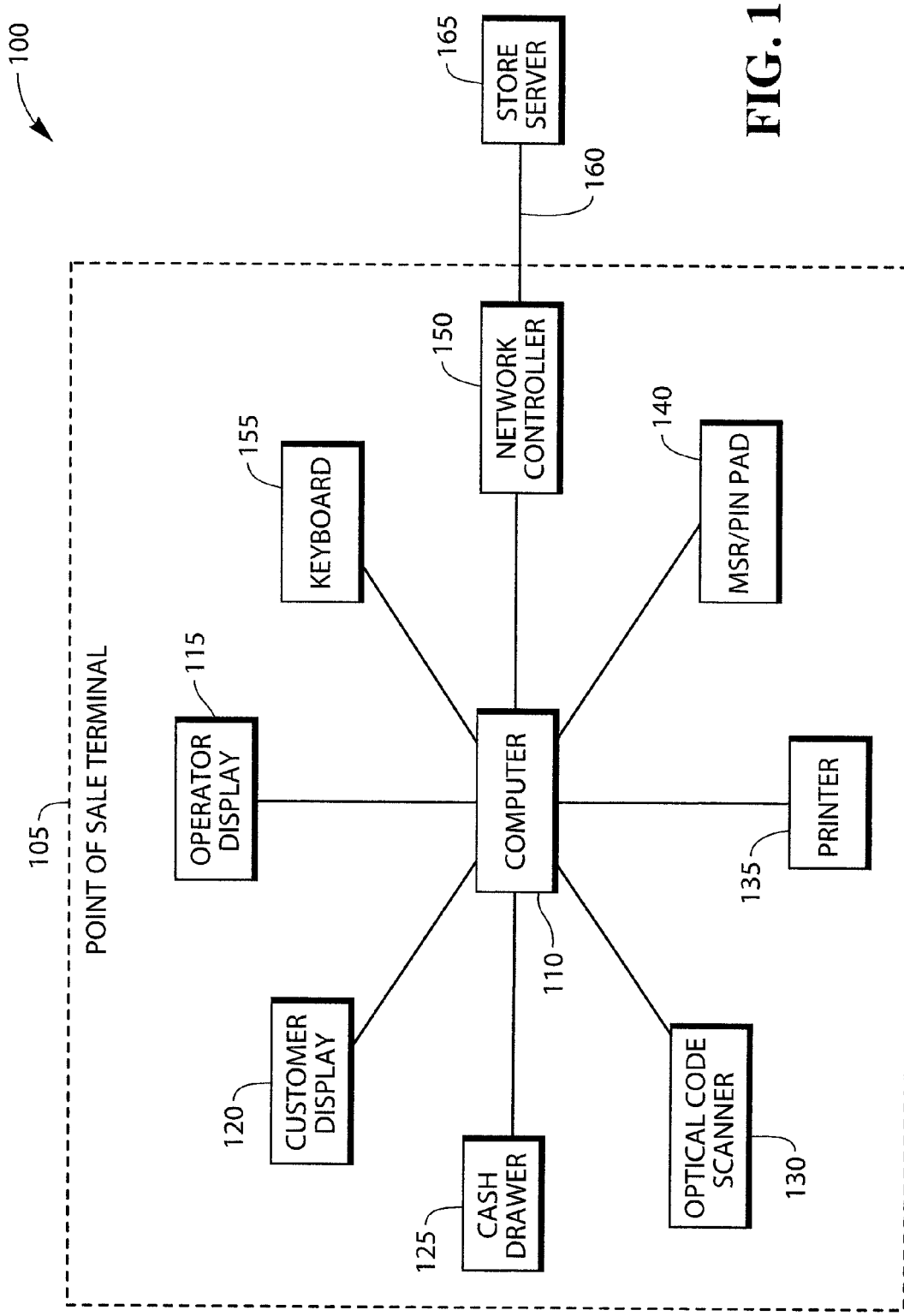
FIG. 1 is a high-level block diagram illustrating a retail point of sale system of the present invention.

With reference to FIG. 1, there is provided a high-level block diagram illustrating a point of sale system 100 including a point of sale (POS) terminal 105 that uses a network 160 to communicate with a store server computer 165. The point of sale system 100 may suitably include more than one POS terminal 105 where each POS terminal 105 communicates over the network 160 with the store server computer 165. The POS terminal 105 may be implemented as either an assisted or a customer operated POS terminal.

In this embodiment, the POS terminal 105 includes a computer 110 and a number of components and peripherals that are controlled by the computer 110. The POS terminal 105 further includes an operator display 115, a customer display 120, a cash drawer 125, an optical code scanner 130, a printer 135, a magnetic stripe reader (MSR) and personal identification number (PIN) pad 140, a network controller 150 and a keyboard 155.

The operator display 115 displays information used by a cashier to operate the POS terminal 105. In this embodiment, the cashier is a trained operator employed to, at least in part, operate the POS terminal 105. The keyboard 155 is used by the cashier to input data and commands to the computer 110. The cash drawer 125 is controlled by the computer 110 and stores currency, checks, coupons and the like. In some embodiments, the cash drawer 125 is replaced by an automatic cash acceptor/dispenser which is controlled by the computer 110 and accepts and dispenses currency. The optical code scanner ("scanner") 130 is used to read optical codes presented to the POS terminal 105 for identification. In some embodiments, the scanner 130 includes a weigh scale as part of a horizontal window (FIG. 2, 235) that determines the weight of an item placed on the horizontal window 235. The customer display 120 is visible to the customer and used to display information about the transaction to the customer.

The network controller 150 has the hardware and software necessary to support a connection to the local area network 160 and for the computer 110 to communicate over the local area network 160 to the store server 165 or other computers and POS terminals on the network 160 or to computers on other networks connected to the local area network 160.

The MSR/PIN PAD 140 reads information from a magnetic stripe usually attached to the back of a card, such as a credit/debit card or loyalty card. The PIN pad portion 140 is used to enter PIN numbers associated with a credit or debit card. The MSR/PIN Pad 140 device also has software and hardware to communicate with an external server used to process credit transactions. The printer 135 is used to print customer receipts and other documents.

Figure 2:
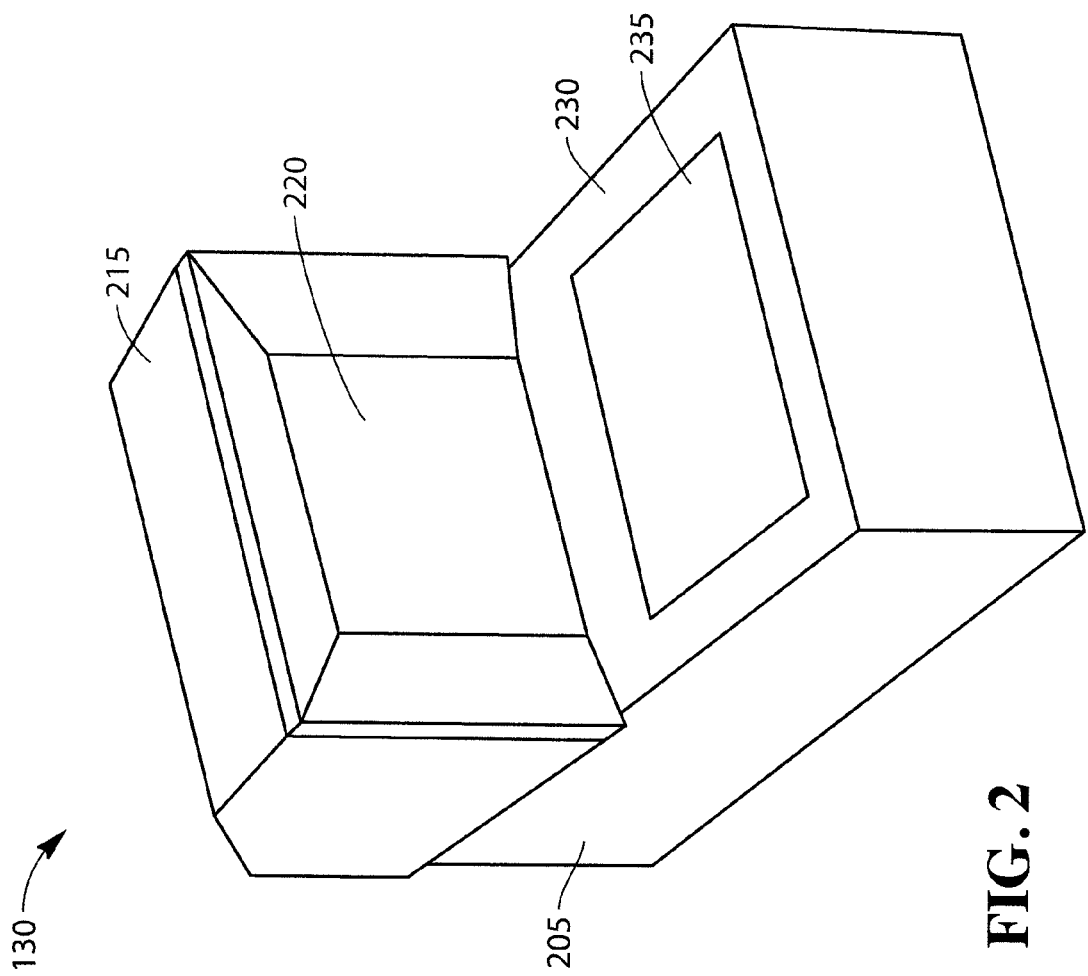
FIG. 2 is a high-level drawing illustrating an optical code scanner of the present invention.

Referring now to FIG. 2, there is provided a high-level drawing illustrating an exemplar embodiment of an optical code scanner 130. The optical code scanner 130 reads optical codes presented to the optical code scanner 130. An optical code is a computer readable representation of information. In this embodiment, the optical code is attached or printed onto an item or object and includes information that identifies the item or object. The optical code may suitably include one dimensional and two dimensional bar codes.

The scanner 130 includes the horizontal scanning window 235 and a vertical scanning window 220. The horizontal scanning window 235 is housed in a horizontal housing component 230 of the scanner 130. The vertical scanning window 220 is housed in a vertical housing component 215 of the scanner 130. The side of the vertical housing component 215 that houses the vertical scanning window 220 is the front of the scanner 130 and faces the operator of the scanner 130.

An operator scans an item by orienting an optical code on the item so it faces either the vertical scanning window 220 or the horizontal scanning window 235 and then moving the item past the windows. The scanner 130 uses imaging technology to capture an image of the optical code and decode or read it. The captured image can also be used for other purposes as will be discussed later.

In some embodiments, the scanner 130 also includes laser scanning technology that uses one or more lasers to scan and read an optical code. The laser beams from the laser are directed in a scanning pattern through the vertical scanning window 220 and the horizontal scanning window 235. When a directed laser beam strikes and moves across an object presented to the scanner 130, the object reflects a portion of the laser light. Some of the reflected laser light passes back through one of the scanning windows (220 or 235) and is directed to a photodetector that produces electrical signal data proportional to the amount of light received. The received electrical signal data is processed to detect the presence of an optical code and to recover the information associated with the optical code.

Figure 3:
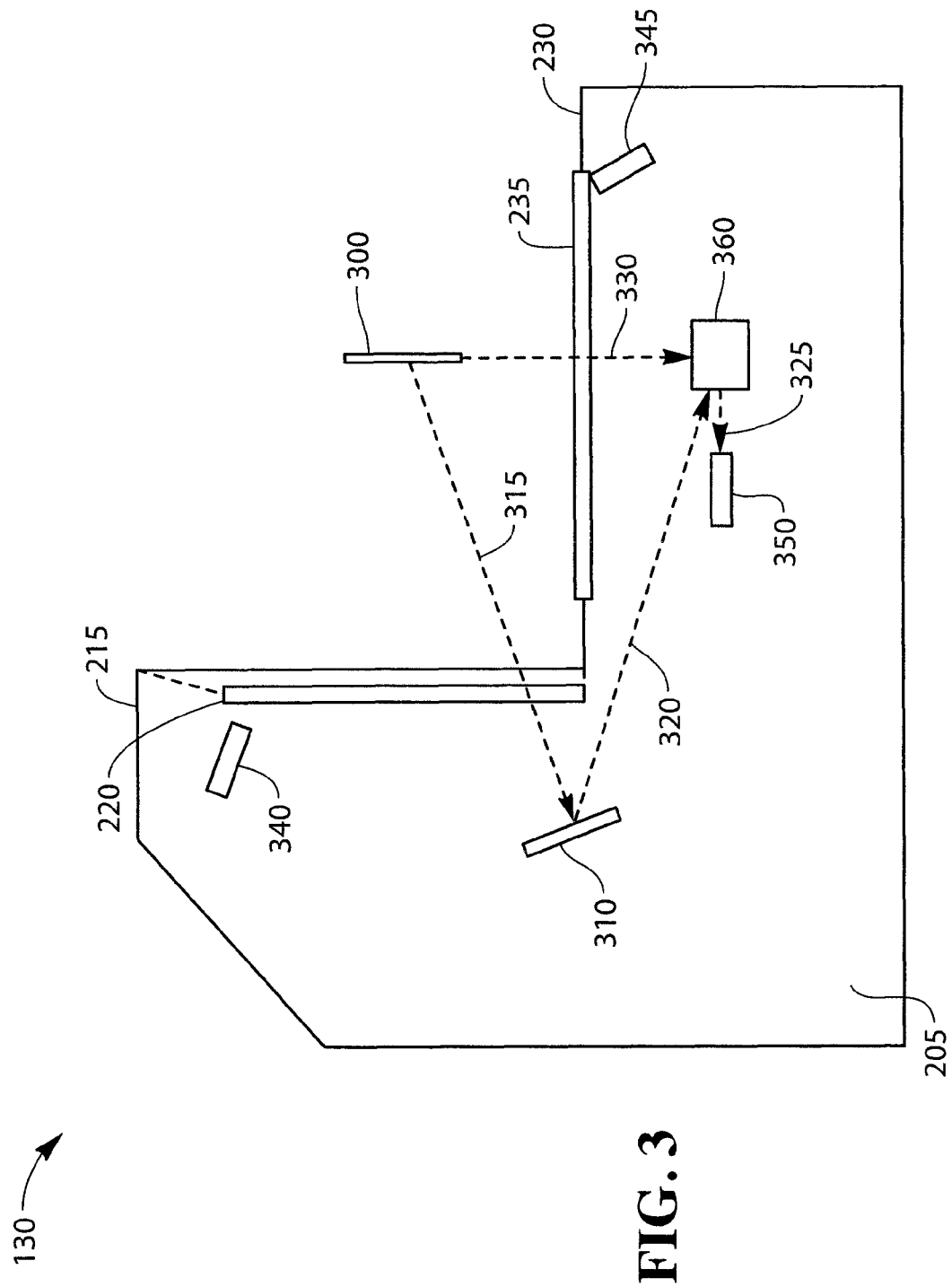
FIG. 3 is a high-level cross-sectional drawing illustrating the optical code scanner.

Referring to FIG. 3, there is provided a high-level cross-sectional drawing further illustrating the exemplar embodiment of the optical code scanner 130. The pattern mirror 310 is one of a plurality of pattern mirrors. The pattern mirror 310 receives an image of object 300 from a first path 315 and reflects the image along a second path 320 to an image directing device 360 which directs the image along a third path 325 to an image capture device 350. The image capture device 350 preferably includes a complementary metal oxide semiconductor (CMOS) image capture device that captures an electronic image of the optical image directed to the CMOS image capture device 350. In some embodiments, other types of image capture devices are used such as devices based on charge coupled device (CCD) technology. The electronic image is captured in the form of digital image data that represents the value of the light received by each pixel of the image capture device 350. The image capture device 350 preferably has a pixel array of 5,000,000 or less pixels which qualifies as a low resolution image capture device.

The image directing device 360 rotates about a vertical axis and includes multiple mirrored surfaces set at different angles. The mirrored surfaces direct images from different image paths to the image capture device 350. Some of the image paths pass through the vertical scanning window 220 and some of the image paths pass through the horizontal scanning window 235. The image paths pass through an area in front of the vertical scanning window 220 and above the horizontal scanning window 235. This is the active scanning area of the scanner 130. A vertical image path 330 passes through the horizontal scanning window 235 up to the bottom of the object 300. There are multiple image paths that are not shown.

The object 300 may suitably be an item that includes an optical code. The image capture device 350 captures an image of the optical code using one of the multiple image paths and reads the optical code. The object 300 may also be a document that is larger than an optical code and the POS terminal 105 is required to capture an image of the entire document. When this occurs, the POS terminal 105 will direct the scanner 130 to enter a document capture mode. This process will be discussed in more detail below.

The scanner 130 further includes a first illumination device 340 that produces and directs light through the vertical scanning window 220 to the active scan area and a second illumination device 345 that produces and directs light through the horizontal scanning window 235 to the active scan area. While depicted as single elements, the illumination devices 340, 345 include a plurality of the illumination devices such as LEDs that are located in different locations.

The current embodiment depicts the scanner 130 with both the vertical scanning window 220 and the horizontal scanning window 235. However, other embodiments are implemented using only a single scanning window. The single scanning window may either be the vertical scanning window 220 or the horizontal scanning window 235.

In some embodiments, the image capture device 350 includes a lens that focuses images directed at the image capture device 350 onto the capture surface of the image capture device 350. In other embodiments, the function of focusing images directed at the image capture device 350 is performed in the image directing device 360. Each facet or reflecting surface of the image directing device 360 is designed to direct images from a single image path to the image capture device 350 and thus is shaped to properly focus an image from this image path onto the image capture device 350.

In another embodiment, the image directing device 360 is a fixed device that does not move and includes one or more reflecting surfaces or mirrors. In this embodiment, there is a first and second image capture device 350. The first image capture device 350 receives images from the vertical scanning window 220 and the second capture device 350 receives images from the horizontal scanning window 235. The image directing device 360 has fixed mirrors that direct images from both the horizontal scanning window 235 and vertical scanning window 220 to the assigned image capture device 350. Each image capture device 350 captures images of the object 300 as it is moved through the scanning area of the scanner 130.

Figure 4:
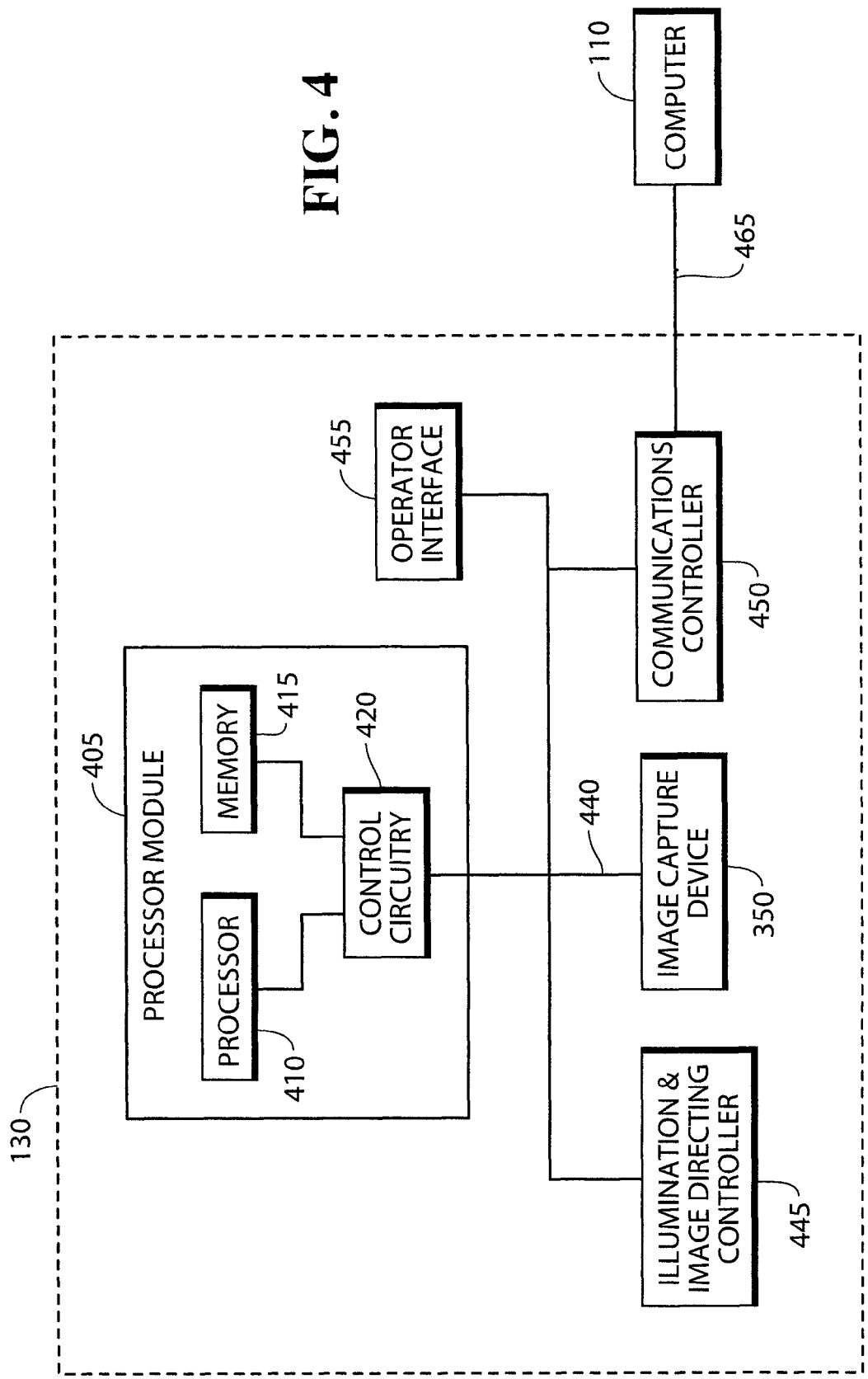
FIG. 4 is a high-level block diagram illustrating selected hardware components of the optical code scanner.

With reference to FIG. 4, there is provided a high-level block diagram illustrating an exemplar embodiment of certain hardware components of the scanner 130. The scanner 130 includes a processor module 405 which includes a processor 410, a memory 415, and control circuitry 420. The memory 415 is non-transitory and computer readable. The memory 415 includes both volatile and non-volatile memory. The non-volatile memory may suitably include solid state and rotating memory devices. The processor 410 executes software stored in the memory 415 which causes the processor 410 to control the components of the scanner 130 and to implement the features and functions of the scanner 130.

The control circuitry 420 includes hardware interfaces between the processor 410 and the memory 415 and between the processor 410 and a bus 440 used to communicate with other components of the scanner 130. The scanner 130 further includes an illumination and image directing controller 445, an operator interface 455 and a communications controller 450.

The illumination and image directing controller 445 controls the illumination devices 340, 345 and the image directing device 360. The controller 445 turns the illumination devices 340, 345 on or off as needed and can also set an illumination level that is between off and full power. Turning these devices off when not in use saves power and reduces noise. The controller 445 also controls stopping or starting the spinning of the image directing device 360. The controller 445 also determines the position of the image directing device 360 which is sometimes used by the processor 410 to determine when to signal the image capture device 350 to capture an image.

The communications controller 450 includes the hardware and software required for the scanner 130 to connect to and communicate over the network connection 465 to the computer 110. In some embodiments, the network connection 465 is implemented as a universal system bus (USB).

The operator interface 455 includes a speaker that produces audible sounds, associated with different functions, which are used to communicate information to the operator.

Figure 5B:
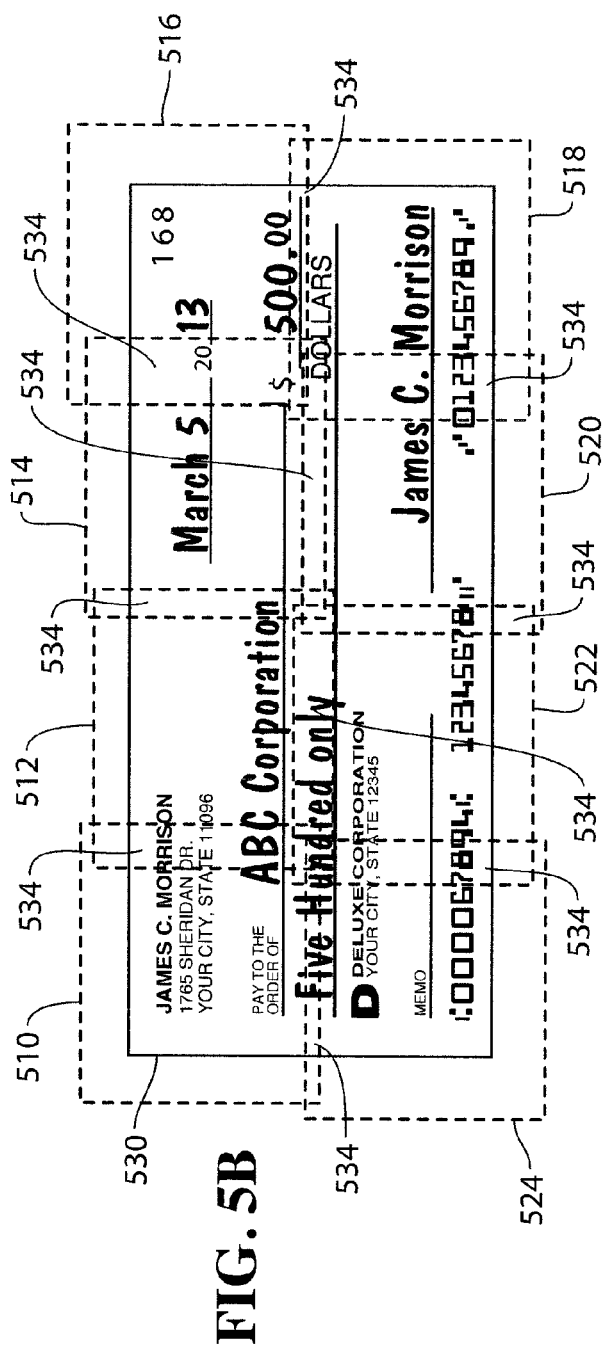
FIGS. 5A, 5B, and 5C are high-level diagrams illustrating different images captured and generated by the optical code scanner.
Figure 5C:
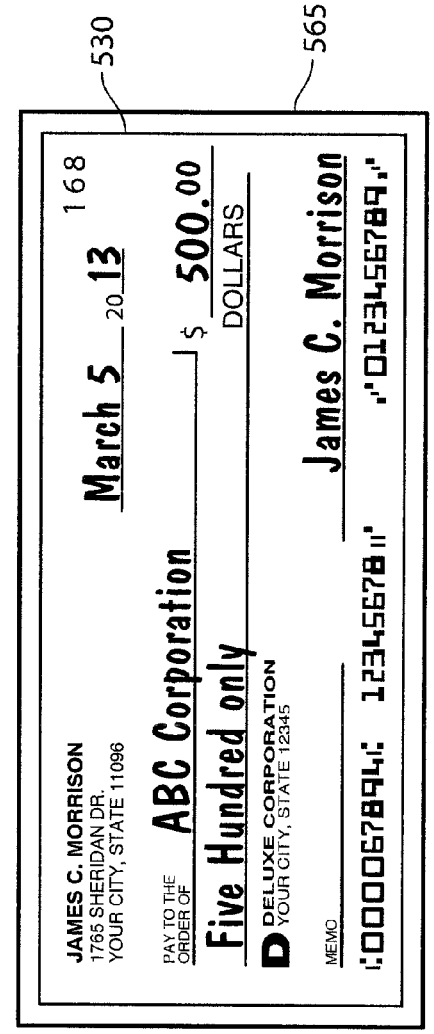
Figure 5A:
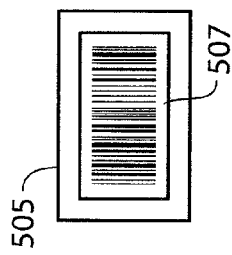

Turning now to FIG. 5A, there is presented a diagram illustrating an image 505 captured by the optical code scanner 130. The optical code scanner 130 operates in a number of different modes. These modes include optical code scanning and document imaging. The image depicted in FIG. 5A is the result of an image captured while the optical code scanner 130 is operating in the optical code scanning mode. The captured image 505 includes a representation of an optical code 507. In this example, the optical code 507 is a one dimensional bar code. The captured image 505 is comprised of image data that includes pixel data generated by the image capture device 350 when the image was captured. The processor 410 processes the image data to identify and recover the data stored in the bar code 507. This process is known as reading the bar code. The data read from the bar code is then transmitted by the processor 410 over the network 465 to the computer 110 of the point of sale terminal 105. The computer 110 then processes the bar code data to identify additional information about the item and add it to a purchase transaction being performed by the point of sale terminal 105.

Turning now to FIG. 5B, there is presented a diagram illustrating multiple images 510, 512, 514, 516, 518, 520, 522, 524 captured by the optical code scanner 130 that together represent a document presented to the optical code scanner 130. The images depicted in FIGS. 5B and 5C are the result of images captured while the optical code scanner 130 is operating in the document imaging mode. In this example, the document is a paper check 530. The optical code scanner 130 will capture images of other types of documents including coupons, identification documents, other types of payment instruments and the like. Because the size of a captured image is smaller than the size of the document, the optical code scanner 130 must capture multiple images of the document where each image includes only a portion of the document. Each of the eight multiple images 510, 512, 514, 516, 518, 520, 522, 524 includes an area of image overlap 534 with the adjacent images. In the overlap 534 area, a portion of the document's images is duplicated in at least two different images. The duplicated portions of the image are used to match and align the images to create a single image of the document. The process of matching and aligning the images is performed by the processor 410 in the optical code scanner 130.

Turning now to FIG. 5C, there is presented a diagram illustrating an image 565 created by the processor 410 that includes a representation of the entire document 530. The image 565 was created by combining portions of the document from each of the eight multiple images 510, 512, 514, 516, 518, 520, 522, 524 to create the entire document 530 in the single image 565.

In the above example, 8 images are required to capture the entire document. The number of images required to capture a document will vary depending on the size of the document and where the document is positioned on the optical code scanner 130 when it is scanned. The document can be positioned either facing the vertical scanning window 220 or placed face down on the horizontal scanning window 235. The image directing device 360 will direct multiple images from different areas of the document without moving the document until the entire document has been imaged. The image directing device 360 rotates and uses multiple mirrored facets set at different angles to direct multiple images to the image capture device 350.

Figure 6:
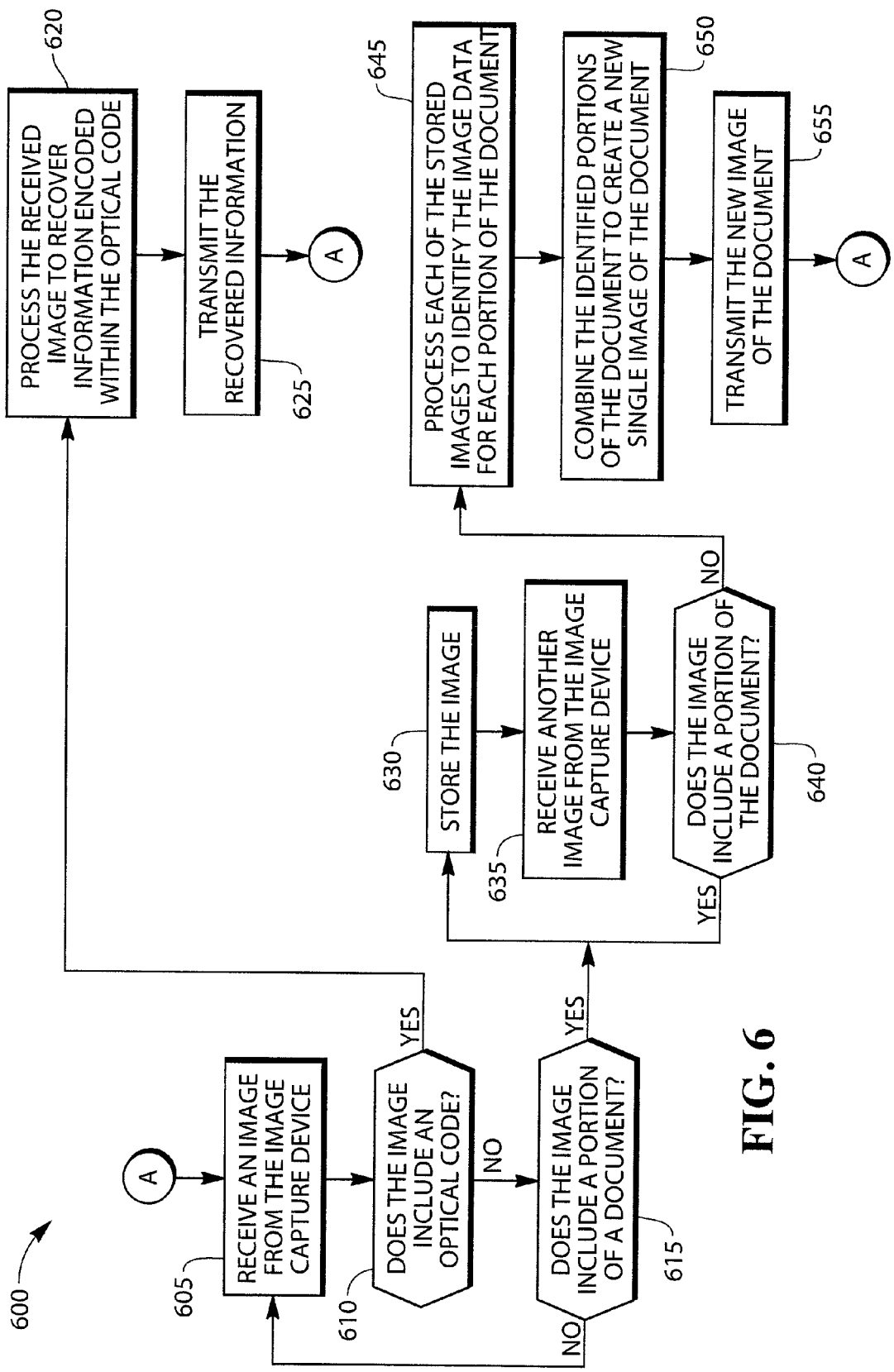
FIG. 6 is a high-level flow diagram illustrating a method of operating the optical code scanner.

Turning to FIG. 6, there is provided a high-level flow diagram illustrating a method 600 of operating the optical code scanner 130. The following method describes one embodiment of the optical code scanner 130 and one example method for operating it. The method described below is performed by the processor 410 in the optical code scanner 130.

In step 605, the processor 410 receives a digital image from the image capture device 350. The image directing device 360 directed the image to the image capture device 350. In some embodiment, the image directing device 360 is fixed and the object being imaged by the image capture device 350 is moved across the optical code scanner 130 by a person operating the optical code scanner 130.

In step 610, the processor 410 determines if the image includes an optical code. If it does, control passes to step 620. If the image does not include an optical code, control passes to step 615.

In step 615, the processor 410 determines if the image includes a portion of a document. If it does, control passes to step 630. If a portion of a document is not found, control passes to step 605 where another image is received.

In step 620, the processor 410 processes the received image to recover information encoded within the optical code. Typically, the optical code is attached or printed on an item and the information identifies the item.

In step 625, the processor 410 transmits the recovered information from the optical code scanner 130 to the computer 110 of the point of sale terminal 105 using the network 265. The computer 110 may suitably use the information to add the item to a purchase transaction. After the information is transmitted, control transfers to step 605.

In step 630, the processor 410 stores the received image so it a can be processed later. Multiple images will be stored before the images are processed to recover the document.

In step 635, the processor 410 receives another image from the image capture device 350. The processor 410 may have to wait for the next image to become available from the image capture device 350. The image directing device 360 must rotate to a new position and the image capture device 350 has to capture a new image before the new image can be read by the processor 410. Status signals from the image capture device 250 are read by the processor 410 to control these functions.

In step 640, the processor 410 determines if the new image includes a portion of the document. If it does, control passes to step 630 where storing of images that include a portion of the document continues. If the image does not include a portion of the document, control passes to step 645 where the images that include a portion of the document begin to be processed.

In step 645, the processor 410 processes each of the stored images that include a portion of the document to identify just the image data that represents a portion of the document.

In step 650, the processor 410 processes the identified portions of the document from each image. Each identified portion is matched and aligned with its adjacent portion to create a whole image of the document. A portion of the edge of each image that has an adjacent image includes image data that overlaps or is duplicated in the adjacent image. This overlapping or duplicated data is used by the processor 410 to determine how to place the images in the proper order and how to align each image with its adjacent image to properly create a whole image. Once all the image data is matched and aligned, a new single image 565 is created or generated that includes an image of the entire document 530. In this example, the document is a check but the document can be a coupon, an identification document such as a driver's license, another instrument of payment or the like.

In step 655, the processor transmits the new image that includes a representation of the whole document from the optical code scanner 130 to the computer 110 of the point of sale terminal 105 using the network 465. The computer 110 may suitably use the information to process the purchase transaction. After the information is transmitted, control transfers to step 605.

Although the present invention has been described with particular reference to certain preferred embodiments thereof, variations and modifications of the present invention can be effected within the spirit and scope of the following claims.

What is claimed is:

1. A computer implemented method comprising the steps of:
   receiving an image from an image capture device;
   executing the following first group of steps when the received image includes an optical code:
      processing the received image to recover information encoded within the optical code; and
      transmitting the recovered information;
   executing the following second group of steps when the image includes a portion of a document:
      storing the image;
      receiving a new image from the image capture device;
      repeating the storing and receiving steps in the second group of steps until the received image does not include a portion of the document and then executing the following third group of steps:
      processing each of the stored images to identify the image data that represents the portion of the document captured within each stored image;
      combining the identified portions of the document from each stored image to create a new single image of the entire document; and transmitting the new image of the document.

2. The method of claim 1, wherein the identified image data for each portion of the document includes image data that is duplicated in an adjacent portion of the document.

3. The method of claim 2, wherein at least 20% of the identified image data within each portion of the document is duplicated within identified image data for an adjacent portion of the document.

4. The method of claim 2, wherein combining the portions of the document includes using the duplicated image data to match and align identified image data for each portion of the document.

5. The method of claim 1, wherein the optical code is attached to an item presented for purchase and the recovered information identifies the item.

6. The method of claim 1, wherein the optical code is a bar code.

7. The method of claim 1, wherein the computer implemented method is implemented by a processor within an optical code scanner.

8. The method of claim 1, wherein transmitting the recovered information includes transmitting the recovered information to a point of sale terminal.

9. The method of claim 1, wherein transmitting the new image of the document includes transmitting the new image of the document to a point of sale terminal.

10. An optical code scanner comprising:
an image capture device operable to capture images of objects presented to the optical code scanner;
a memory including computer instructions stored therein; and
a processor in communication with the image capture device and the memory where the processor is operable to execute the computer instructions and when the processor executes the computer instructions they cause the processor to perform the following steps:
receiving an image from the image capture device;
executing the following first group of steps when the received image includes an optical code:
processing the received image to recover information encoded within the optical code; and
transmitting the recovered information;
executing the following second group of steps when the image includes a portion of a document:
storing the image;
receiving a new image from the image capture device;
repeating the storing and receiving steps in the second group of steps until the received image does not include a portion of the document and then executing the following third group of steps:
processing each of the stored images to identify the image data that represents the portion of the document captured within each stored image;
combining the identified portions of the document from each stored image to create a new single image of the entire document; and transmitting the new image of the document.

11. The optical code scanner of claim 10, further including a rotatable image directing device configured to direct a plurality of images from different image paths to the image capture device.

12. The optical code scanner of claim 10, further including a communications controller that is operable to control an external data network attached to the optical code scanner.

13. The optical code scanner of claim 10, wherein the identified image data for each portion of the document includes image data that is duplicated in an adjacent portion of the document.

14. The optical code scanner of claim 10, wherein at least 20% of the identified image data within each portion of the document is duplicated within identified image data for an adjacent portion of the document.

15. The optical code scanner of claim 10, wherein combining the portions of the document includes using the duplicated image data to match and align identified image data for each portion of the document.

16. The optical code scanner of claim 10, wherein the optical code is attached to an item presented for purchase and the recovered information identifies the item.

17. The optical code scanner of claim 10, wherein the optical code is a bar code.

18. A point of sale terminal comprising:
a computer configured to control the devices and functions of the point of sale terminal;
an operator display in communication with the computer; and
an optical code scanner in communication with the computer, the optical code scanner comprising:
an image capture device operable to capture images of objects presented to the optical code scanner;
a memory including computer instructions stored therein; and
a processor in communication with the image capture device and the memory where the processor is operable to execute the computer instructions and when the processor executes the computer instructions they cause the processor to perform the following steps:
receiving an image from the image capture device;
executing the following first group of steps when the received image includes an optical code:
processing the received image to recover information encoded within the optical code; and
transmitting the recovered information;
executing the following second group of steps when the image includes a portion of a document:
storing the image;
receiving a new image from the image capture device;
repeating the storing and receiving steps in the second group of steps until the received image does not include a portion of the document and then executing the following third group of steps:
processing each of the stored images to identify the image data that represents the portion of the document captured within each stored image;
combining the identified portions of the document from each stored image to create a new single image of the entire document; and
transmitting the new image of the document.

19. The terminal of claim 18, wherein the identified image data for each portion of the document includes image data that is duplicated in an adjacent portion of the document.

20. The terminal of claim 19, wherein combining the portions of the document includes using the duplicated image data to match and align identified image data for each portion of the document.

* * * * *